United States Patent

[11] 3,625,594

[72] Inventor Conrad Lanza
　　　　　　　Putnam Valley, N.Y.
[21] Appl. No. 837,598
[22] Filed June 30, 1969
[45] Patented Dec. 7, 1971
[73] Assignee International Business Machines
　　　　　　　Corporation
　　　　　　　Armonk, N.Y.

[54] ELECTRIC FIELD GRADIENT BEAM DEFLECTOR
　　　8 Claims, 5 Drawing Figs.
[52] U.S. Cl. .................................................... 350/160 R
[51] Int. Cl. ...................................................... G02f 1/28
[50] Field of Search ......................................... 331/94.5;
　　　　　　　　　　　　　　　　　　　　　　　　　　　　　350/160

[56] References Cited
　　　　　UNITED STATES PATENTS
3,320,013　5/1967　Johnson ........................ 350/160
3,475,078　10/1969　Gordon ......................... 350/160

OTHER REFERENCES

" IBM Technical Disclosure Bulletin" " Uniform Optical Deflection by Electric Fields"; A. W. Smith; Vol. 8 011; April 1966; pg. 1562–1564

Primary Examiner—Ronald L. Wibert
Assistant Examiner—V. P. McGraw
Attorneys—Hanifin and Jancin and John E. Dougherty, Jr.

ABSTRACT: The beam deflector is formed of a body of $n$-type gallium arsenide. Ohmic contacts are made at opposite ends of the body. The doping concentration ($n$) and the length ($l$) of the body are such that the $n\ l$ product is less than the critical value for inherent bulk oscillations. A voltage above a threshold value applied to the body produces a field gradient across the body. This field gradient produces a gradient in index of refraction for light at energies close to the band gap of the gallium arsenide. The source of light to be deflected is a gallium arsenide injection laser which emits light at less than band gap energy. The laser beam is passed through the gallium arsenide deflector and deflected under the control of voltages applied across the ohmic contacts.

PATENTED DEC 7 1971 3,625,594

INVENTOR
CONRAD LANZA

BY John E. Laughlin Jr.
ATTORNEY

ELECTRIC FIELD GRADIENT BEAM DEFLECTOR

BACKGROUND OF THE INVENTION

1. Field of the Invention

The invention relates to light deflector systems made up of a light source and light deflector and, more particularly, to a laser beam deflector in which the deflection is produced in a body of semiconductor material.

2. Description of the Prior Art

There are many known light deflectors for laser beams and the characteristics of a number of these deflectors are surveyed in an article by V. J. Fowler and J. Schlafer which appeared at pp. 1,437–1,444 in the Proceedings of the IEEE, Vol. 54, No. 10, Oct., 1966. Further, there have been a number of articles and patents which are directed to devices that rely for their operation on the bulk negative differential conductivity which produces bulk oscillations in semiconductor materials such as gallium arsenide. Typical of such devices are Gunn oscillators operated in various modes. There have also been a number of articles dealing with the phenomenological characteristics of gallium arsenide. Representative of this prior art are the following:

a. Article by McCumber and Chynoweth which appeared in IEEE Transactions on Electron Devices, Vol. ED 13, pp. 4–21, Jan., 1966;

b. An article by B. Seraphin and N. Bottka which appeared in Applied Physics Letters, Vol. 6, No. 7, Apr. 1, 1965, pp. 134–136;

c. An article by H. Kroemer which appeared in the IEEE Spectrum, Jan. 1968, pp. 47–56.

SUMMARY OF THE INVENTION

In accordance with the principles of the present invention, a simple high-speed light deflector is produced using as an active light deflecting element a body of semiconductor material which exhibits a bulk negative differential conductivity. The semiconductor body is prepared so that it does not produce inherent bulk oscillations. When a voltage above a threshold value is applied, the body exhibits a gradient in its electric field. This field gradient is accompanied by a gradient in the index of refraction which is most pronounced for input light at an energy slightly less than the band gap energy for the semiconductor. The gradients in field and index of refraction are amplitude and polarity sensitive so that the deflection of the input light is controllable to produce a large number of recognizable spots. The device is small and can be operated with relatively small control voltages. The response of the device is fast so that high speed and high frequency control are achieved. A typical embodiment includes a gallium arsenide injection laser light source and a gallium arsenide light deflector device.

OBJECTS OF THE INVENTION

Thus, it is an object of the present invention to produce new and improved light deflection systems.

It is another object to produce new and improved light deflection devices.

It is still another object to provide small, high-speed light deflectors which can be controlled to deflect light to a large number of recognizable spots.

Another object is to produce improved light deflection systems for laser applications.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
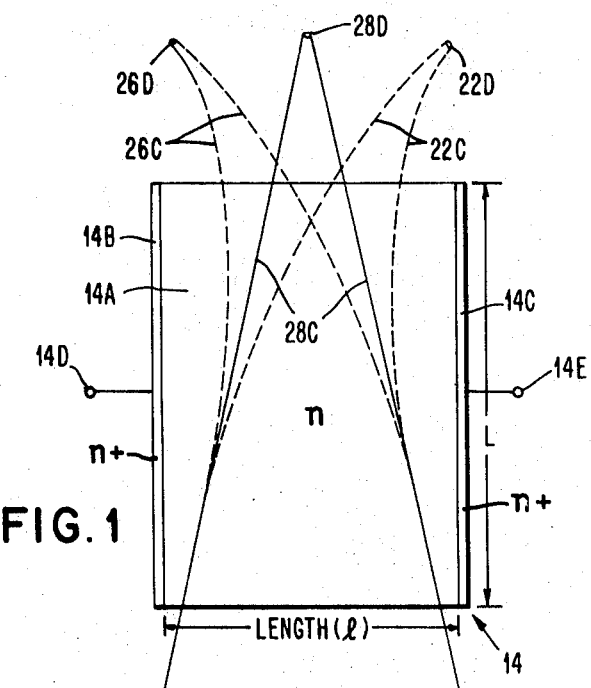
FIG. 1 is a schematic representation of an embodiment of a light deflection system according to the present invention.

In the deflection system shown in FIG. 1, the input light to be deflected is supplied by a light source 10, and is focused by an appropriate lens system, represented at 12, to pass through a light deflector 14 and focus at a spot on the other side of the deflector. The light deflector 14 is formed of a body of semiconductor material, preferably gallium arsenide, which has the property that it exhibits a bulk negative differential conductivity. The body of gallium arsenide is so prepared that it does not respond to a field above a critical threshold to produce bulk oscillations. More specifically, the deflector device includes a body of $n$-type gallium arsenide 14A and a pair of ohmic connections 14B and 14C at opposite ends of the body. Terminals 14D and 14E are connected to these contacts and a voltage is supplied across these terminals to control the electric field distribution in the gallium arsenide body. The concentration ($n_o$) of excess electrons in body 14A and the length ($l$) of the body are such that the ($n_o l$) product is below the critical value for bulk oscillations. Typically, in gallium arsenide the critical value is about $10^{12}$ cm.$^{-2}$ or less, and can vary somewhat from sample to sample.

When the $n_o l$ product is below the critical product, the application between terminals 14D and 14E of a constant voltage exceeding the threshold necessary to cause the threshold electric field in the body 14A to be exceeded, produces a stable nonuniform field distribution along the length of the body between the ohmic contacts 14B and 14C. Assuming the voltage is applied in a polarity such that ohmic contact 14B is the cathode and contact 14C is the anode, the electric field distribution is illustrated by dashed curve 20 in FIG. 2 for an applied voltage slightly above threshold. As shown by this curve, the electric field is least intense near the cathode and increases with increasing distance from the cathode until a maximum value of field intensity is reached adjacent the anode of the device.

There is thus an electric field gradient produced in the gallium arsenide body 14A and the gradient is clearly nonlinear when the applied voltage is only slightly above threshold. In fact, the region of high field is restricted to that portion of the body which is adjacent the anode 14C. When the voltage is increased in the same polarity to a value greatly in excess of the threshold voltage, as is illustrated by dashed curve 22 in FIG. 2, the field intensity also increases as does the field gradient which also is more nearly linear.

Figure 3:
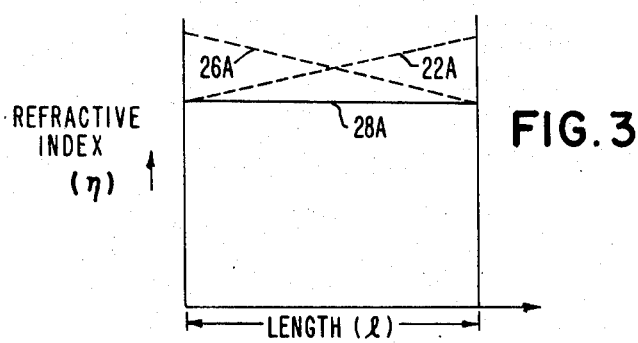
FIG. 3 is a plot illustrating the index of refraction characteristic, and the gradients in this characteristic for slightly less than band gap energy light, produced by field gradients in the light deflecting device.

When an electric field gradient is established in the gallium arsenide body 14A, this gradient produces a change in the index of refraction $\eta$ in the body. This change in index of refraction is only significant for radiation having an energy close to the band gap in the semiconductor. In gallium arsenide, the band gap energy at room temperature is about 1.4 electron volts, and the useful change in index of refraction is most pronounced in a range between 0.02 and 0.1 electron volts below the band gap energy. This change in refractive index along the length ($l$) of the body is illustrated in FIG. 3 by curve 22A which illustrates the change in refractive index for the field gradient represented by curve 22 in FIG. 3. Curve 22A is an idealized linear curve, but serves to show that as the field increases due to the field gradient in the direction from cathode to anode, there is an accompanying increase in the index of refraction in the gallium arsenide.

Figure 2:
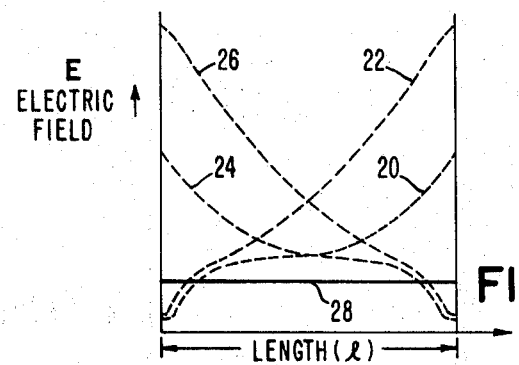
FIG. 2 is a plot illustrating the electric field distribution and field gradients along the length ($l$) of the light deflecting device of FIG. 1 for different operating conditions.

The response of the gallium arsenide body 14A of FIG. 1 is similar when the voltage is applied in the opposite polarity between terminals 14D and 14E, the only difference being that in this case the field and index of refraction increases from right to left. When the polarity of the applied voltage is such that contact 14C is the cathode and contact 14B is the anode, the field distribution is represented in FIG. 2 by curve 24 for an applied voltage slightly above threshold, and by curve 26 for an applied voltage greatly in excess of the threshold voltage. The change in index of refraction $\eta$ for the field gradient of curve 26 in FIG. 2 is illustrated by dashed curve 26A in FIG. 3.

To complete the graphical representation, curve 28 is shown in FIG. 2, and curve 28A in FIG. 3, to illustrate the constant electric field and unchanging index of refraction in the gallium arsenide body when the voltage applied is below threshold. In this case, the field throughout the body is constant and below the threshold electric field $E_T$, and, therefore, the index of refraction is similarly constant. This is due to the fact that bulk negative differential conductivity is exhibited by the gallium arsenide body only when the threshold field $E_T$ is exceeded, and it is the bulk negative differential conductivity which causes the gradient in electric field to be produced. Similarly, it is not the electric field itself which produces the change or gradient in index of refraction but rather a gradient or change in the electric field. Again, it is noted that the gradient in index of refraction is for light having an energy close to the band gap energy of the semiconductor gallium arsenide.

Figure 4:
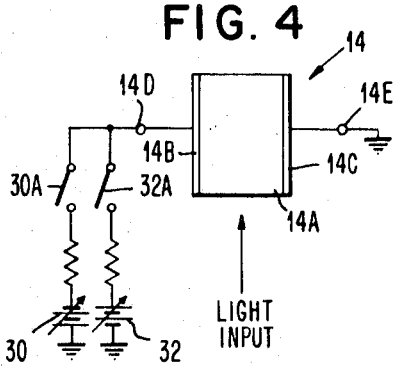
FIG. 4 is a schematic showing of a circuit for controlling deflection in the system of FIG. 1.

FIG. 4 is a schematic representation of the circuit connections made to the device 14 to produce deflection of an input light beam in the manner illustrated in FIG. 1. In FIG. 4, like components are identified with the same reference numerals that are used in FIG. 1. Two variable voltage sources 30 and 32 provide variable voltages of opposite polarity to terminal 14D under control of switches represented at 30A and 32A. When switch 30A is closed and a negative voltage of sufficient amplitude is applied to terminal 14D, contact 14B is the cathode and contact 14C is the anode, and the field gradient and index of refraction gradient are as shown by curves 22 and 22A in FIGS. 2 and 3. With the voltage applied, the input light from source 10, and focused by lens 12, is deflected as shown in FIG. 1 as it passes through the gallium arsenide body 10 along the path defined by dashed lines 22C and is focused at spot 22D. When both of the switches 30A and 32A of FIG. 4 are open, or when one switch is closed and the voltage applied is below the threshold voltage, the light from source 10 is not deflected as it passes through the gallium arsenide body and the input light follows the path indicated by lines 28C and is focused at spot 28D. When switch 32A is closed to apply a positive voltage above the threshold value at terminal 14D, the field gradient and index of refraction gradient are as illustrated by curves 26 and 26A in FIGS. 2 and 3, and the light is deflected, as shown by lines 26C in FIG. 1, and focused at spot 26D.

It has been stated above that the gradient in index of refraction produced by the electric field gradient is significant only for light having energies close to the band gap of the gallium arsenide. However, though input light having an energy slightly greater than band gap can be deflected, the light will be highly absorbed in the gallium arsenide. Therefore, the input light to be deflected has an energy which is slightly less than band gap, and specifically within a range of energies at which the change in index of refraction is most pronounced.

Figure 5:
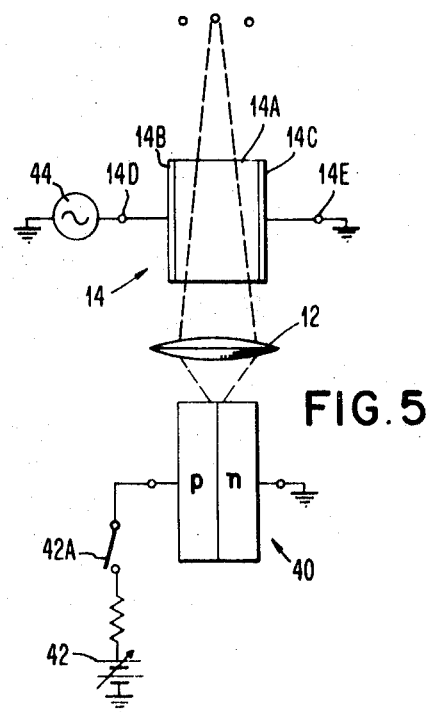
FIG. 5 is an illustration of an embodiment of the invention in which light produced by a gallium arsenide injection laser is deflected by a gallium arsenide light deflector.

The embodiment shown in FIG. 5 illustrates a system of this preferred type. In this system the light to be deflected is supplied by a gallium arsenide injection laser 40. The laser is driven by a forward bias voltage supply 42 under control of switch 42A. The output energy of the infrared lasing light of the injection laser is slightly below the band gap of the gallium arsenide and this light is applied as the light input to the deflector device 14, also formed of gallium arsenide. In the embodiment of FIG. 5, the voltage applied to device 14 is an alternating voltage from a source 44. With the application of this voltage, the beam is deflected back and forth (more precisely to the left and right as shown in the figure) continuously about the central spot in which the light is focused in the absence of deflection.

Since the peak for the gradient of index of refraction may vary in different semiconductor bodies, and in some cases it may be desirable to change the energy of the input light, the output of the input laser may be controlled by doping or by using an alloy to produce the input light at the proper energy. Of course, the input diode need not be operated in a lasing mode but electroluminescent diodes may also be used. It is, of course, understood that the material of the active deflecting body 14 need not be gallium arsenide, but any Gunn effect material may be used as long as the $n_o l$ product is below the critical value. Further, other semiconductors, which do not have a sufficiently strong bulk negative differential conductivity that they can be prepared to efficiently or easily exhibit Gunn oscillations, do respond to a field above a threshold to exhibit the required uniform field gradient necessary to the practice of the invention.

A typical device useful as a light deflector according to the principles of the invention is formed of a body of $n$-type gallium arsenide having an excess electron concentration ($n_o$) of about $(5)(10^{13})$ carriers per cm$^3$. The length ($l$) of the device between the contacts is $10^{-2}$ cm. The $n_o l$ product is about $(5)(10^{11})$ cm$^{-2}$. Very high field gradients can be established in such a body and a maximum field can be developed near the anode which is many times the critical field for gallium arsenide which is 3,500 volts per cm. The device has a light path length L of about 78 mils. The response of the device to exhibit a high field gradient is very fast and allows the device to be driven by a high frequency voltage in the gigaHertz range (up to about 50 gigaHertz).

A true measure of the performance of the device is the number of resolvable spots, that is, distinctly different spots to which the beam can be deflected. For this device, which is very small, about 14 resolvable spots are realizable on either side of the central or undeflected beam position shown at 28D in FIG. 1. Since to achieve this operation, a significant current is carried by the very small device, the ohmic contacts are connected to or made part of heat sinks which conduct heat away. Even with heat sinks, operation at these levels is more easily realized on a pulsed rather than continuous basis. The applied voltage need only reach a maximum amplitude, which is typically about 500 volts, so that it can be switched in polarity and amplitude without too much difficulty. Since the gallium arsenide device is small, the problems that are sometimes encountered due to piezoelectric effects are largely avoided. Finally, since the light source can be chosen from the ever-growing number of optically pumped lasers, electroluminescent diodes, and injection lasers, and a large number of semiconductors with different band gaps may be used for the material of the deflector, light deflector systems according to the invention can easily be tailored to the needs of a large number of different applications.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A light beam deflector system comprising:
   a. a semiconductor device including a body of semiconductor material having first and second contacts at opposite ends of the body;
   b. voltage supply means connected to said contacts for applying to said body a voltage above a threshold necessary to exceed a threshold field in said body;
   c. said body exhibiting a bulk negative differential conductivity and responding to said above threshold voltage to produce in the body a stable electric field gradient which increases across said body from a low value to a high value in a direction from the contact which is more negative to the contact which is more positive;

d. and means for directing light to be deflected through said body in a direction having a component substantially normal to said electric field gradient, the energy of said light passing through said body being close to but less than the band gap energy of said semiconductor body.

2. The system of claim 1 wherein said voltage means includes means for modulating said voltage to thereby modulate the deflection of said light.

3. The system of claim 2 wherein said voltage supply means includes means for applying a signal of alternating polarity to said contacts to cause the light to be deflected first in one direction and then in the opposite direction.

4. The system of claim 1 wherein said body is a body of $n$ type gallium arsenide in which the product $n_o l$ is less than the critical value for inherent bulk oscillations where $n_o$ is the concentration of excess majority carriers and $l$ is the length of the body between the first and second contacts.

5. The system of claim 4 wherein said light directing means includes a gallium arsenide injection laser.

6. A light beam deflector system comprising:
a. a body of $n$-type gallium arsenide having first and second contacts for applying a voltage to the body;
b. said body having an $n_o l$ product less than the critical value of bulk oscillations, where $n_o$ is the concentration of excess electrons and $l$ is the length of the body between the contacts;
c. a gallium arsenide injection laser and means for applying a signal to said laser to produce a lasing output;
d. said gallium arsenide injection laser being mounted relative to said semiconductor body so that the lasing output of the laser is directed through said body in a direction normal to the length between said contacts;
e. and means connected to said contacts for applying a voltage above the threshold necessary to produce bulk negative differential conductivity and an electric field gradient in the body between said contact.

7. In a laser system:
a. an injection laser and means coupled to the laser for producing a lasing light output;
b. a control means for the laser comprising a body of semiconductor material oriented to receive the lasing output of the laser, said body when a voltage is applied above a threshold value in a direction normal to the direction of said laser output exhibiting, in said direction normal, a bulk negative differential conductivity, a stable electric field gradient, and a gradient in its index of refraction for the laser light;
c. and means for applying a voltage above the threshold value to said body in a direction normal to the laser light.

8. The laser system of claim 7 wherein said injection laser comprises a first body of gallium arsenide including a PN-junction, and said control means comprises a second and separate body of gallium arsenide having an $n_o l$ product less than the critical value for inherent bulk oscillations.

* * * * *